March 22, 1960 R. E. SPITLER 2,929,351

SOUND CONTROL FOR TELEPHONE RINGER

Filed May 21, 1958 2 Sheets-Sheet 1

INVENTOR.
Robert E. Spitler
BY C. R. Sipe
Atty.

March 22, 1960 R. E. SPITLER 2,929,351

SOUND CONTROL FOR TELEPHONE RINGER

Filed May 21, 1958

2 Sheets-Sheet 2

INVENTOR.
Robert E. Spitler
BY C. R. Sipe
Atty.

United States Patent Office 2,929,351
Patented Mar. 22, 1960

2,929,351

SOUND CONTROL FOR TELEPHONE RINGER

Robert E. Spitler, Downers Grove, Ill., assignor to General Telephone Laboratories, Incorporated, Northlake, Ill., a corporation of Delaware Application May 21, 1958, Serial No. 736,857
6 Claims. (Cl. 116—149)

This invention relates to telephone substation apparatus and more particularly to ringers for this type of apparatus.

It is an object of the present invention to provide a novel gong deadener, primarily for use in telephones, which allows the gongs to be muted singly or jointly.

A further object of the invention is to present for use in wall mounted telephones, a sound adjustment which can be easily reached and manipulated by the subscriber when the telephone is in its normally mounted position.

Another object consists in the provision of a sound adjustment for telephone handset bells which will be effective on bells responsive to all forms of ringing current, including harmonic ringing.

A feature of the invention consists in the use of an eccentric crank which can be controlled from the exterior of the telephone casing in which the gongs are mounted.

In the past, considerable difficulty has been encountered in providing sound control and adjustment for bells responsive to harmonic ringing. The usual sound control currently prevalent on subscriber telephones has been restricted to use on straight line or divided ringers. To meet this need many other forms of bell adjustment have been tried and found wanting.

The present invention provides a gong deadener which may be applied to a ringer of any type and mute one or both of the gongs. In the normal position both bells are allowed to resonate when struck by the clapper rod. The second position deadens one gong, and allows the remaining bell to respond. The third position mutes both bells to provide a sound similar to that obtained from a buzzer.

The drawings showing the invention and its objects include:

Fig. 1 showing a front view of the wall mounting telephone with the front cover removed to show the phone interior.

Fig. 2 showing in detail the bells and the gong deadener crank.

Figures 1, 2:
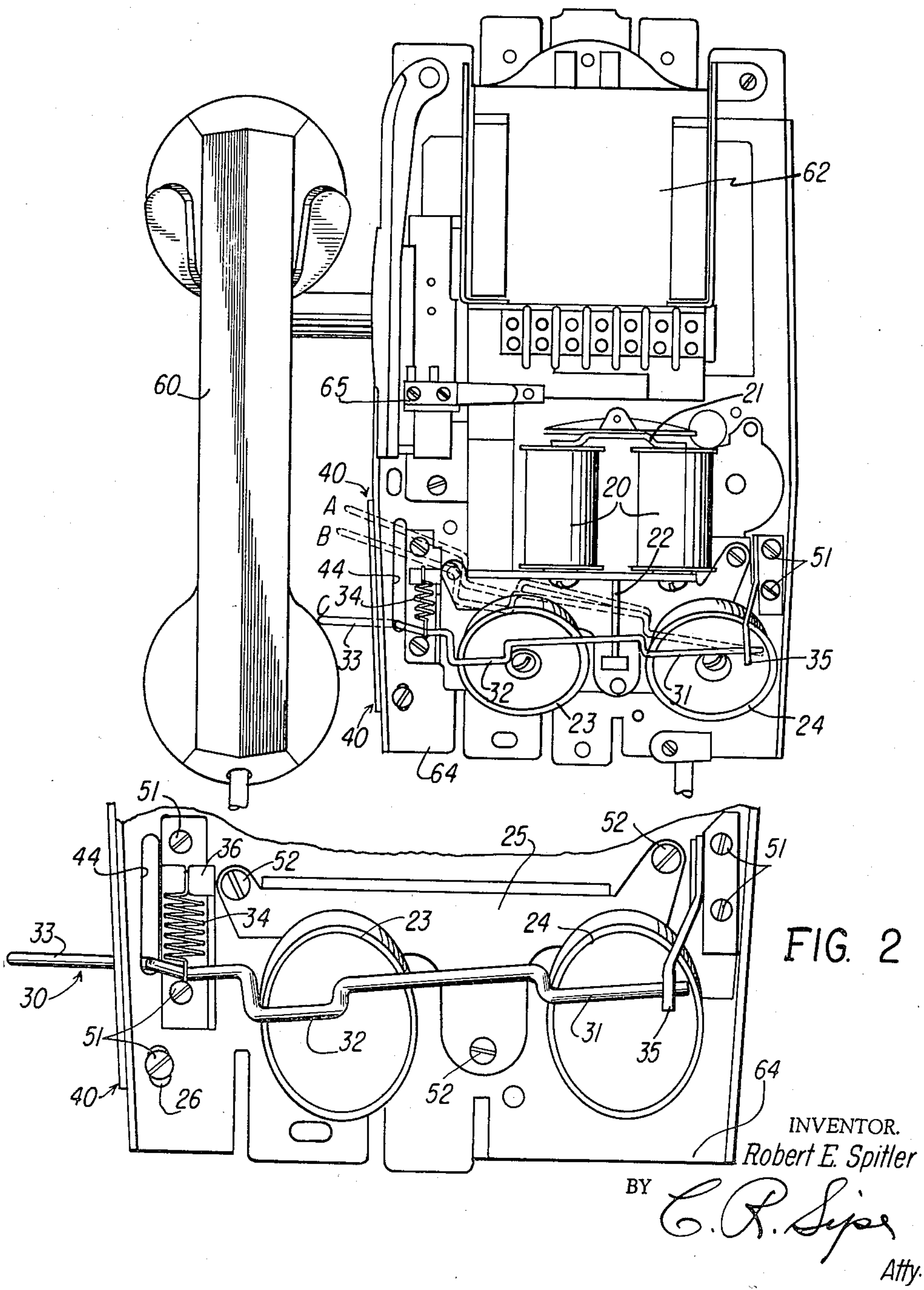
Figure 3:
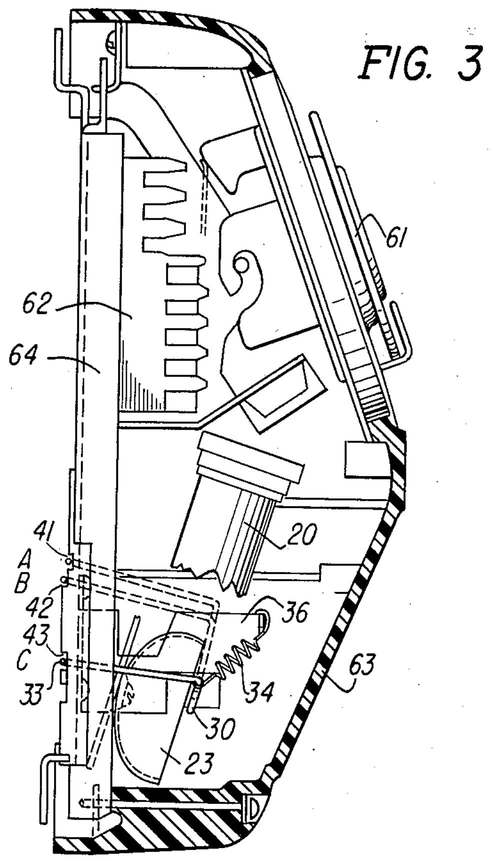
Fig. 3 is a cutaway side view of the phone showing the interior construction.
Figure 5:
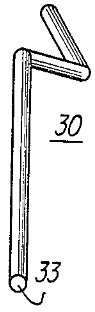
Figs. 5 and 6 show two views of the eccentric crank.
Figure 6:
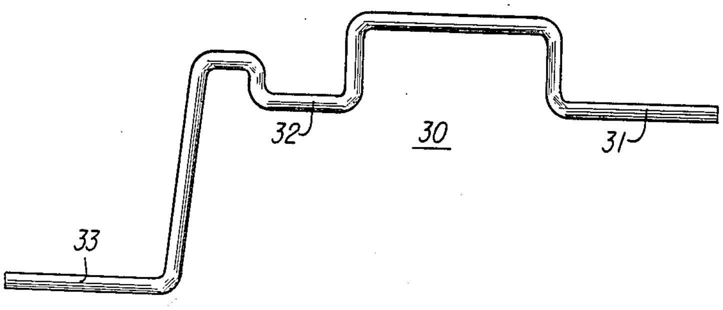

In Figs. 1 and 3 is shown a wall monophone having on its front upper face a dial 61 of known design. Behind the dial is mounted a housing 62 for transmission components. At the side of the phone is handset 60 with its internal mounting and hookswitch spring assembly 65. At the lower end of the phone is the twin coil electromagnet 20 having an armature 21 with a clapper rod 22 extending downward therefrom. The clapper rod extends between the bells or gongs 23 and 24 and is capable of alternately striking both on energization of the coils. The gongs are of generally hemi-spheroid shape and are mounted on a common bracket 25 which is mounted to the base plate 64 of the phone proper. All the items which have been listed heretofore are of generally known design and function in the usual manner.

At the right side of the base plate is mounted bracket 35 which extends outwardly from the base plate 64 and has toward its free end a hole of sufficient size to mount within it the diameter of eccentric crank 30. The other end of crank 30 is secured by means of helical spring 34 to the extension of left side bracket 36. Each of these brackets 35 and 36 are mounted to base plate 64 by means of screws 51 which are fitted into elongated or slotted holes to allow the brackets a nominal amount of play and adjustment.

The crank 30 has a pair of parallel crankpin sections 31 and 32 each of which is normally positioned above the left side of the respective gongs 24 and 23. At its left extremity crank 30 has an arm 33 which when the crank is mounted to the base plate, extends through base plate slot 44 and extends laterally from the body of the telephone.

The crank 30, as mentioned is held on the right side in a rigid bracket 35 and on the left side is held toward the bracket 36 by means of helical spring 34. The crank is manipulated from the left side by arm 33. As arm 33 is moved, bracket 35 serves as a bearing in which the crank may rotate while spring 34 allows the left side of the crank to rotate through an arc.

Thus the right side crankpin 31 travels through an arc of small radius, while left crankpin 32 is allowed a much greater radius of arc travel. It is through this combination of rigid mounting at the right end of the crank and the freer rotative mounting of the left side which allows the different effects to be produced in the various possible positions.

Figure 4:
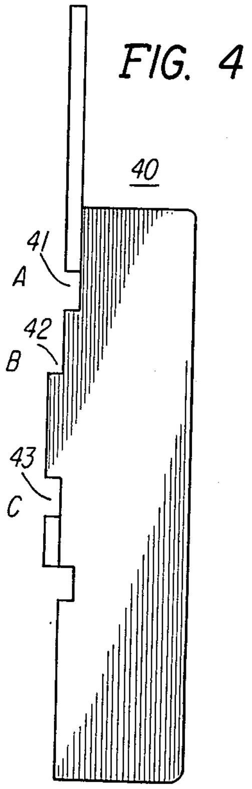
Fig. 4 shows a side view of the handle positioning bracket.

Mounted on the rear of base plate 64 is stop plate 40 as shown in detail in Fig. 4. This plate also has elongated holes for its mounting to the base and when mounted extends along the left side of the base plate in the area of the eccentric crank arm 33. The stop plate 40 has along its rear surfaces notches 41, 42 and 43.

The crank is normally positioned in the position "C" which is the one shown in Fig. 2. With crank arm 33 resting in slot 41, both crankpins 31 and 32 are poised above the gongs but make no engagement with the gongs. On energization of the electromagnet 20 the gongs will ring in the normal manner. It may be noted in the Fig. 2 view that the crank is mounted to form an angle with the horizontal. Thus, when crank arm 33 is moved into the B notch 42, the right crankpin 31 is moved into tangency with the adjacent surface of bell 24. The left crankpin 32 remains above and not contacting gong 23. In the B position, gong 23 rings in an unimpeded manner and gong 24, which is firmly contacted by crankpin 31, emits a buzzing sound. Therefore, the ringer, in general, emits a somewhat muted tone as contrasted with the tone of the C position.

When the crank arm 33 is rotated into the A notch, crankpin 31 remains in contact with gong 24, but in this position crankpin 32 contacts gong 23. In this the A position, both gongs are muted and, as mentioned, a buzzing tone is emitted. With the crank arm in the A position, spring 34 is in tension and the crank arm is held in the A notch, notch 41. In Fig. 3 it can also be seen that the spring 34 tends to pull the crank 30 away from base plate 64 which tends to hold the crank arm firmly in the required notch.

In Figs. 1 and 3 the crank 30 is shown in the C position with the crank location for the A and B positions dotted. In this manner, the movement of the crank to perform the required functions can be readily appreciated.

What is claimed is:

1. A telephone sound deadener for a telephone base having a pair of gongs of substantially hemi-spheroid shape, each hemi-spheroid having a flared wall extending freely outward, comprising an eccentric crank rotatably mounted transversely to said gongs, said crank having a plurality of crankpins, one of said crankpins normally maintained poised above the flared wall of each of said gongs, means for holding said crank in a first rotated position, a first of said crankpins contacting one of said gong flared walls in said first rotated position to thereby deaden any sound emitted by said contacted gong.

2. In a deadener as claimed in claim 1, means for maintaining said crank in a second rotated position in which said first crankpin contacts the flared wall of said one gong and the second crankpin contacts a second of said gongs to thereby deaden any sound emitted by either of said gongs.

3. In a telephone set, a base having a ringer therein and a gong deadener, said ringer comprising a pair of substantially hemi-spheroid gongs and a clapper rod for alternately striking said gongs to emit a ringing sound, said deadener comprising an eccentric crank having a handle at one extremity, a pair of crankpins, and an axle, journal means for maintaining said axle coaxially rotative, first means for holding said handle in a first position, said crankpins in said first position free of said gongs, second means for maintaining said handle in a second position with said crank rotated at its handle end, a first of said crankpins in said second position contacting one of said gongs to deaden the sound emitted by said contacted gong when struck by the clapper rod, third means for holding said handle in a third rotative position, a second of said crankpins contacting another of said gongs in said third position, said first crankpin maintaining contact with said one gong in said third position, both said contacted gongs thereby emitting a buzzing sound when struck by said clapper rod.

4. A gong deadener as claimed in claim 3, in which said handle has a transverse section extending out of said base to allow manipulation of said handle from position to position, said first, second, and third holding means comprising a plurality of notches in said base for resting therein said extending section, and means for holding said extending section firmly in one of said positions comprising a tension spring at the handle end of said crank restraining said handle end to rotative motion.

5. In a telephone set having a ringer including a pair of hemi-spheroid gongs and a clapper rod operated to alternately strike the gongs to emit a ringing sound, a gong deadener comprising: a crankshaft rotatably mounted transversely to the open ends of said gongs; means for holding said crankshaft in a first predetermined rotated position; means for holding said crankshaft in a second predetermined rotated position; a first crankpin secured to said crankshaft in an angular position relative to the arc of rotation of said crankshaft for contacting one of said gongs in both the first and second rotated positions of said crankshaft; and a second crankpin secured to said crankshaft in an angular position relative to the arc of rotation thereof different from the angular position of said first crankpin for contacting the other gong only in said second rotated position.

6. In a telephone set having a ringer including a pair of hemi-spheroid gongs positioned with their open ends lying in substantailly the same plane and a clapper operated to alternately strike the gongs to emit a ringing sound, a gong deadener comprising: a crankshaft rotatably mounted at a first end adjacent the open ends of the gongs and substantially parallel to their plane, the second end of said crankshaft yieldably mounted for both rotating and lateral movement; means for moving said crankshaft to a first predetermined rotated position; a first crankpin secured to said crankshaft for movement therewith into contact with one of said gongs when said crankshaft is in said first predetermined position; means including the yieldable holding means on the second end of said crankshaft for rotating said shaft through a predetermined arc of rotation to a second predetermined position while maintaining said first crankpin in contact with one gong; and a second crankpin secured to said crankshaft in an angular position relative to its arc of rotation for movement into contact with the other gong only when said crankshaft is rotated to its second predetermined position.

References Cited in the file of this patent

UNITED STATES PATENTS 2,808,019 Houdek ---------------- Oct. 1, 1957